(12) United States Patent
Jeong

(10) Patent No.: US 8,978,145 B2
(45) Date of Patent: Mar. 10, 2015

(54) APPARATUS AND METHOD FOR CONTROLLING DIGITAL RIGHTS OBJECT IN PORTABLE TERMINAL

(75) Inventor: Chang-Jin Jeong, Seoul (KR)

(73) Assignee: Samsung Electronics Co., Ltd (KR)

( * ) Notice: Subject to any disclaimer, the term of this patent is extended or adjusted under 35 U.S.C. 154(b) by 1283 days.

(21) Appl. No.: 11/765,721

(22) Filed: Jun. 20, 2007

(65) Prior Publication Data

US 2007/0294774 A1 Dec. 20, 2007

(30) Foreign Application Priority Data

Jun. 20, 2006 (KR) .................. 10-2006-0055236

(51) Int. Cl.
*H04L 29/06* (2006.01)
*G06F 21/10* (2013.01)

(52) U.S. Cl.
CPC ........ *G06F 21/10* (2013.01); *G06F 2221/2137* (2013.01)
USPC .......................................................... 726/26

(58) Field of Classification Search
CPC ...................................................... G06F 21/10
USPC .......................................................... 726/26
See application file for complete search history.

(56) References Cited

U.S. PATENT DOCUMENTS

| | | | |
|---|---|---|---|
| 6,711,687 B1 * | 3/2004 | Sekiguchi ...................... 726/23 |
| 8,099,369 B2 * | 1/2012 | Fahrny et al. .................... 705/71 |
| 2003/0233553 A1 * | 12/2003 | Parks et al. ..................... 713/178 |
| 2004/0157600 A1 * | 8/2004 | Stumpert et al. ........... 455/432.1 |
| 2004/0203848 A1 | 10/2004 | Kumar |
| 2004/0243834 A1 | 12/2004 | Stefik et al. |
| 2005/0177513 A1 * | 8/2005 | Kim ................................ 705/51 |
| 2006/0233132 A1 * | 10/2006 | Lee ................................ 370/328 |
| 2006/0248596 A1 * | 11/2006 | Jain et al. ......................... 726/27 |
| 2007/0110109 A1 * | 5/2007 | Jennings et al. ............... 370/516 |
| 2007/0266256 A1 * | 11/2007 | Shah et al. ..................... 713/178 |

FOREIGN PATENT DOCUMENTS

GB 2403382 A * 12/2004 ................ G06F 1/00
JP 2005165816 6/2005

* cited by examiner

*Primary Examiner* — Michael S McNally
(74) *Attorney, Agent, or Firm* — The Farrell Law Firm, P.C.

(57) ABSTRACT

An apparatus and method for controlling a rights object in Digital Rights Management in a portable terminal are provided. In the method, a first time zone information of network is detected when the rights object for content is provided. A second time zone information of network is detected when the content is used. An absolute time difference between the time zone informations is computed when the first time zone information is not equal to the second time zone information. As such, use authority for the content is managed by controlling the rights object according to the absolute time difference.

16 Claims, 2 Drawing Sheets

US 8,978,145 B2

APPARATUS AND METHOD FOR CONTROLLING DIGITAL RIGHTS OBJECT IN PORTABLE TERMINAL

PRIORITY

This application claims priority under 35 U.S.C. §119(a) to a Korean Patent Application filed in the Korean Intellectual Property Office on Jun. 20, 2006 and allocated Serial No. 2006-55236, the contents of which are incorporated herein by reference.

BACKGROUND OF THE INVENTION

1. Field of the Invention

The present invention relates generally to Digital Rights Management (DRM) in a portable terminal, and in particular, to an apparatus and method for controlling a rights object according to a change in a time zone in a portable terminal.

2. Description of the Related Art

DRM is technology used to protect content providers' rights and profits by preventing content from being illegally copied and distributed. Unlike analog content, digital content can be copied without loss. Thus, the digital content can be easily copied and distributed without permission. The DRM serves to protect the content providers against such infringement.

The content includes a media object and a rights object. The rights object has use authority for the content. For example, the rights object sets the use authority for the content such as playing, displaying, executing, printing, exporting or reading the digital works. The rights object, which has information about whether or not the use authority for the content exists, needs to be used to perform the DRM for the content used in a portable terminal.

The rights object uses reference values such as a use count, a use time and a use interval to set the use authority for the content. Here, the use count is used to set the number of available accesses to the content. The use time is used to set the absolute time from the time that the content is downloaded until the time that the content cannot be used. The use interval is used to set a predetermined time period from the time that the content is initially accessed. As a result, the rights object controls the use authority for the contents. If the rights object is completely consumed, the use authority for the content is terminated, so the content becomes unusable.

As described above, the rights object uses the reference values to set the use authority for the content. The use count among the reference values controls the use authority according to the number of times the content is used in the portable terminal, or the number of accesses to the content regardless of time zone. The use time and the use interval control the use authority according to the time zone in the portable terminal. For example, the use time and the use interval are managed only by the specified time in the portable terminal.

If the portable terminal moves across time zones, the absolute time in the portable terminal changes. The rights object using the use time or the use interval does not recognize the absolute time change in the portable terminal, and so the rights object manages the use authority according to the previously established time in the portable terminal. Thus, problems such as the abuse or unauthorized use of the content may arise. For example, when a user purchases content on Jan. 1, 2006, the content includes the rights object which uses a use interval as the use authority, the user can use the content for seven days as the use interval, and, thereafter, if the user moves into a different time zone which is, for example, 14 hours earlier than a previous time zone, there is the problem that the user will be prevented from using the content for 14 hours in the use interval. Similarly, when a user purchases content on Jan. 1, 2006, if the content includes the rights object which uses a use time as the use authority, the user can use the content until Jan. 2, 2006, and, thereafter, if the user moves into a different time zone which is, for example, 14 hours later than a previous time zone, there is the problem that the users will exceed their authorized use of the content beyond 14 hours.

SUMMARY OF THE INVENTION

An object of the present invention is to substantially solve at least the above problems and/or disadvantages and to provide at least the advantages below. Accordingly, an object of the present invention is to provide an apparatus and method for controlling the DRM for content according to an absolute time change due to time zone changes of a portable terminal.

Another object of the present invention is to provide an apparatus and method for controlling a rights object according to an absolute time change due to a time zone change in a portable terminal, and for using content for a period included in the rights object.

A further object of the present invention is to provide an apparatus and method for detecting an absolute time change using Mobile Network Code (MNC)/Mobile Country Code (MCC) of a network, and for controlling a rights object according to the absolute time change in a portable terminal.

According to one aspect of the present invention, a method for controlling a rights object in the DRM in a portable terminal includes detecting a first time zone information of network at the time that the rights object for content is provided; detecting a second time zone information of network at the time that the content is used; computing an absolute time difference between the time zone informations when the first time zone information is not equal to the second time zone information; and managing use authority for the content by controlling the rights object according to the absolute time difference.

According to another aspect of the present invention, an apparatus for controlling a rights object in the DRM in a portable terminal. The apparatus includes a time zone detection unit for detecting a first time zone information at the time that the rights object for content is provided and a second time zone information at the time that the content is used; a rights object control unit for computing an absolute time difference between the time zone informations and for controlling the rights object when the first time zone information is not equal to the second time zone information; and a content use possibility judgment unit for judging whether or not the content can be used using the controlled rights object.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention provides technology for performing DRM of content according to an absolute time change by controlling a rights object in accordance with the absolute time change due to time zone change in a portable terminal. Herein, the portable terminal computes the absolute time using a time stamp included in a message, or uses a network that supports Network Identity and Time Zone (NITZ). Generally, the rights object has details of use authority for digital works.

Figure 1:
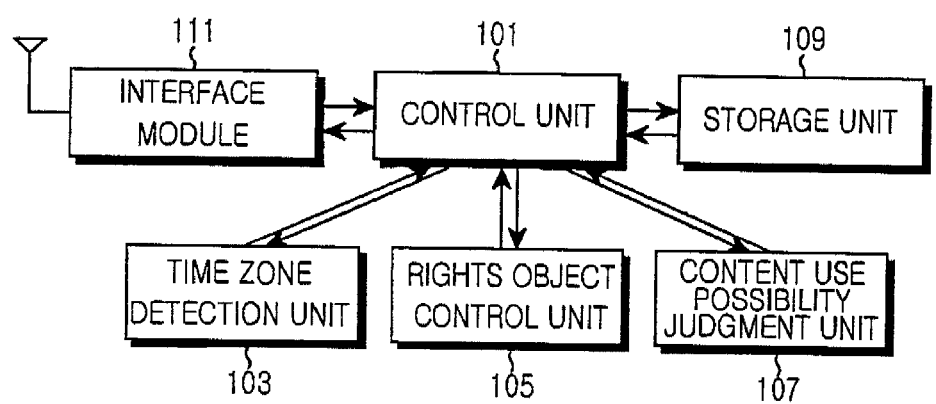
FIG. 1 is a schematic diagram of a portable terminal according to the present invention.

FIG. 1 is a block schematic of a portable terminal according to the present invention.

In FIG. 1, a control unit 101 controls the overall operation of the portable terminal. For example, the control unit 101 performs processing and controlling functions for voice and data communication services. Moreover, when a time zone changes according to the present invent, the control unit 101 computes an absolute time difference between time zones, and controls a rights object for content in accordance with the absolute time difference.

A time zone detection unit 103 detects a time zone to which the portable terminal belongs, and provides the time zone information to the control unit 101 when the rights object for content is supplied and the content is used. The time zone detection unit 103 detects the time zone information using Mobile Network Code (MNC)/Mobile Country Code (MCC) for a network used by the portable terminal. A rights object using use time is provided from a rights issuer when the content is downloaded. A rights object using use interval is provided when the content is firstly accessed.

In operation, when the content is provided, the time zone detection unit 103 provides the time zone information (i.e. MNC/MCC information) of the network used by the portable terminal to the control unit 101, and the control unit 101 stores the time zone information in a storage unit 109.

When the time zone of the network used by the portable terminal changes, a rights object control unit 105 computes the absolute time difference due to the time zone change, and controls the rights object in accordance with the absolute time difference under the control of the control unit 101. For example, in the rights object control unit 105, MNC/MCC information detected when the rights object is provided is compared with MNC/MCC information detected when the content is used. Each MNC/MCC information is detected in the time zone detection unit 103. If each MNC/MCC information is different from the other, the absolute time difference between the two MNC/MCC informations is computed, and the rights object is controlled according to this absolute time difference.

A content use possibility judgment unit 107 decides the existence of use authority for the content by judging whether or not the controlled rights object is completely consumed. The controlled rights object is provided from the control unit 101. Thereafter, the result of the judgment is transmitted to the control unit 101. The content use possibility judgment unit 107 recognizes that the use authority is terminated if the rights object is completely consumed.

The storage unit 109 stores a program for controlling the whole operation of the portable terminal, and the temporary data produced during the execution of the program. Also, the storage unit 109 stores the time zone information at the time the rights object is provided to the portable terminal according to the present invention. Here, the storage unit 109 stores the MNC/MCC information of the network at the time the rights object is provided to the portable terminal.

An interface module 111 is used to communicate with a cell and includes an RF processing unit and a baseband processing unit.

As above described, the control unit 101 controls the time zone detection unit 103, the rights object control unit 105, and the content use possibility judgment unit 107. The control unit 101 may also operate to perform functions of the time zone detection unit 103, the rights object control unit 105, and the content use possibility judgment unit 107. In the present invention, each unit is configured separately in order to explain each function separately. Accordingly, the control unit 101 may be configured to perform all of the functions or part of the functions when the control unit 101 is implemented substantially.

Figure 2:
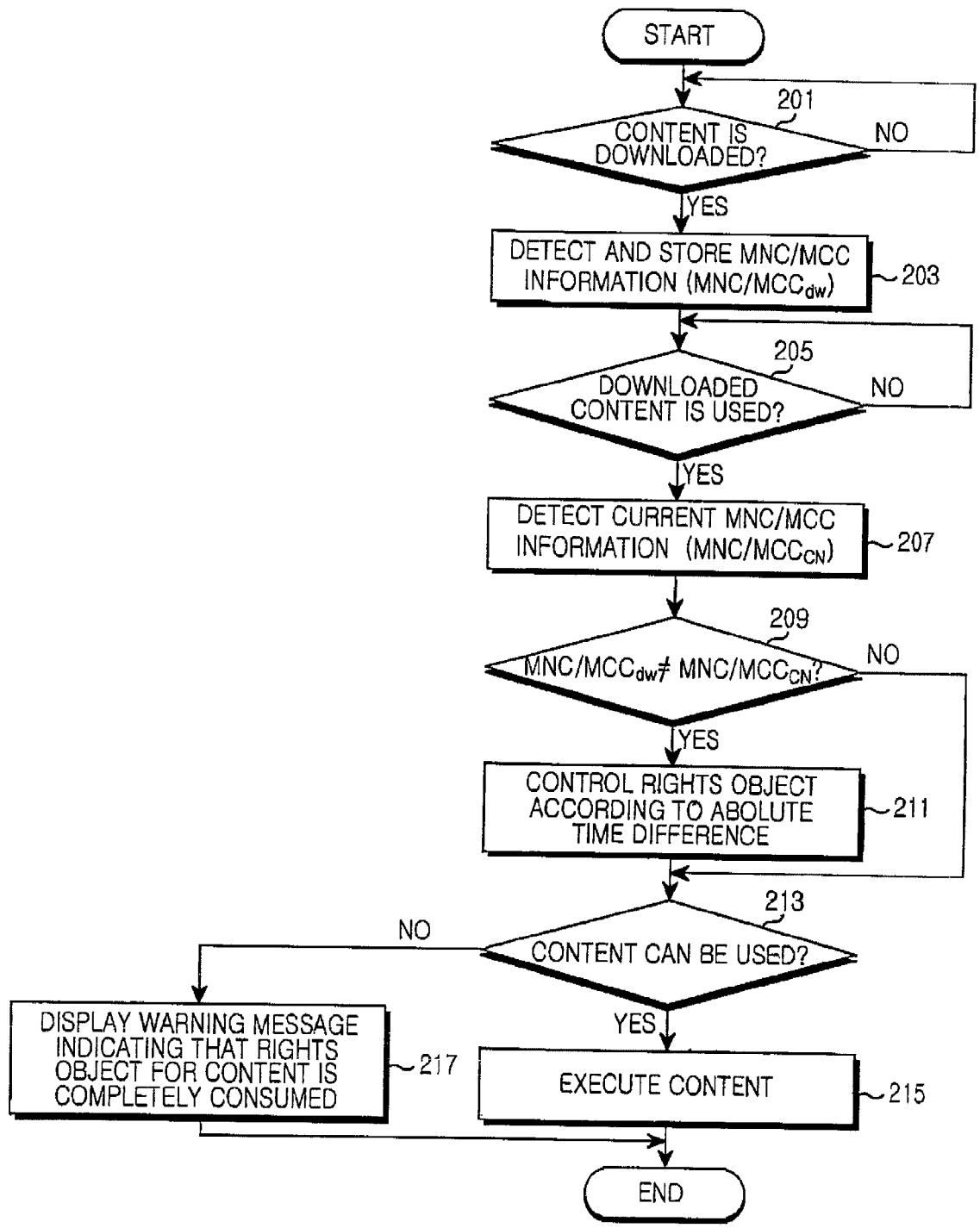
FIG. 2 is a flow diagram illustrating a procedure for controlling a rights object according to the present invention.

FIG. 2 is a flow diagram illustrating a procedure for controlling a rights object using the use time according to the present invention.

In FIG. 2, a control unit 101 first checks whether or not content is downloaded to the portable terminal by the user's key operation in step 201.

Next, when the content is downloaded, the control unit 101 detects MNC/MCC information of a first network through which the content is downloaded, and stores the MNC/MCC information in a storage unit 109 in step 203. Here, the rights object using the use time is provided from a rights issuer when the content is downloaded, and thus, the MNC/MCC information of the first network is detected.

The control unit 101 then checks whether or not the downloaded content is selected by user's key operation in step 205.

When the downloaded content is selected, the control unit 101 then detects the MNC/MCC information of a second network used currently by a portable terminal having the downloaded content in step 207.

The MNC/MCC information (MNC/MCC$_{dw}$) of the first network through which the content is downloaded is compared with the MNC/MCC information (MNC/MCC$_{cn}$) of the second network used currently by the portable terminal in the control unit 101, in order to detect an absolute time change according to time zone change in step 209.

If the MNC/MCC$_{dw}$ is equal to the MNC/MCC$_{cn}$ (MNC/MCC$_{dw}$=MNC/MCC$_{cn}$), the two networks belong to the same time zone so that an absolute time of the portable terminal does not change. Thus, the control unit 101 checks the rights object provided from the rights issuer, and decides whether or not the downloaded content can be used in step 213. That is, the control unit 101 checks whether or not the rights object is completely consumed.

Conversely, if the MNC/MCC$_{dw}$ is not equal to the MNC/MCC$_{cn}$ (MNC/MCC$_{dw}$≠MNC/MCC$_{cn}$), then the control unit 101 computes the absolute time difference according to inconsistency between time zones to which the two networks belong respectively, and controls the rights object in step 211. That is, the rights object is controlled according to the absolute time difference due to the time zone change so as to prevent the rights object from being abused.

Next, the control unit 101 checks the controlled rights object, and decides whether or not the downloaded content can be used in step 213. That is, the control unit 101 checks whether or not the rights object is completely consumed.

If the downloaded content can be used, that is, the rights object for the downloaded content is not completely consumed; the control unit 101 executes the downloaded content in step 215. Then the control unit 101 ends this process.

If, however, the downloaded content cannot be used, that is, the rights object for the downloaded content is completely consumed; the control unit 101 then displays a warning message on a display unit in step 217. The warning message indicates that use authority for the downloaded content is terminated in step 217. Then the control unit 101 ends this process.

In the embodiment described above, although this process is described for the use time based rights object, this process can be similarly applied to a use interval based rights object. However, the rights object using the use interval is provided from the rights issuer when the content is first accessed. Thus, MNC/MCC information of a network at the time that the content is first accessed, detected, and stored.

As described above, a rights object is also controlled according to an absolute time difference due to time zone change by managing the MNC/MCC information of a network in a portable terminal. Accordingly, downloaded content is prevented from being used, more or less, according to the absolute time difference. As such, there is the advantage of having the rights object in the DRM to be managed correctly.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for controlling a rights object in a Digital Rights Management (DRM) in a portable terminal, the method comprising the steps of:
    detecting first time zone information of a network in which the portable terminal is located at a time that the rights object for content is provided, at a time zone detection unit of the portable terminal;
    detecting second time zone information of a network in which the portable terminal is located at a time that the content is used, at the time zone detection unit of the portable terminal;
    detecting an absolute time difference between the first time zone information and the second time zone information when the first time zone information is not equal to the second time zone information, at a rights object control unit of the portable terminal; and
    controlling a use time of the rights object for the content according to the absolute time difference, at the rights object control unit of the portable terminal,
    wherein the first time zone information and the second time zone information are detected using MNC (Mobile Network Code)/MCC (Mobile Country Code) information.

2. The method of claim 1, further comprising determining when the rights object is provided from a rights issuer at the time that the content is downloaded if the rights object is a use time based rights object, or determining when the rights object is provided from the rights issuer at the time the content is first accessed if the rights object is a use interval based rights object.

3. The method for claim 1, further comprising determining whether the controlled rights object is completely consumed, and executing the content if the controlled rights object is not consumed completely.

4. The method for claim 3, further comprising displaying a warning message indicating that the controlled rights object for the content is completely consumed if the controlled rights object is completely consumed.

5. The method for claim 3, further comprising determining whether the rights object is completely consumed when the first time zone information is equal to the second time zone information.

6. An apparatus for controlling a rights object in a Digital Rights Management (DRM) in a portable terminal, the apparatus comprising:
    a time zone detection unit that detects first time zone information of a network in which the portable terminal is located at the time that the rights object for content is provided, and second time zone information of a network in which the portable terminal is located at the time that the content is used;
    a rights object control unit that detects an absolute time difference between the first time zone information and the second time zone information, and controls a use time of the rights object for the content according to the absolute time difference when the first time zone information is not equal to the second time zone information; and
    a content use possibility judgment unit that judges whether the content can be used using the controlled use time of the rights object,
    wherein the time zone detection unit detects the first time zone information and the second time zone information using MNC/MCC information of a network.

7. The apparatus for claim 6, wherein the time zone detection unit further detects the second time zone information at the time that the content is downloaded if the right object is a use time based rights object, detects the second time zone information at the time the content is first accessed if the right object is a use interval based rights object, and detects the second time zone information at the time that the content is used.

8. The apparatus for claim 6, wherein the content use possibility judgment further judges whether the content can be used by checking whether the controlled rights object is completely consumed.

9. A method for a Digital Rights Management (DRM) in a portable terminal having a function of detection a time zone change, the method comprising the steps of:
    detecting a time zone information change due to a movement of the portable terminal, at a time zone detection unit of the portable terminal; and
    controlling a use time of a rights object for content in accordance with the time zone information change when the time zone information change is detected, at a rights object control unit of the portable terminal,
    wherein the time zone information change is detected using MNC (Mobile Network Code)/MCC (Mobile Country Code) information change.

10. The method for claim 9, further comprising determining whether the controlled rights object is completely consumed, and executing the content if the controlled rights object is not consumed completely.

11. The method for claim 10, further comprising displaying a warning message indicating that the controlled rights object for the content is completely consumed if the controlled rights object is completely consumed.

12. The method for claim 10, further comprising determining whether the rights object is completely consumed when first time zone information is equal to second time zone information.

13. The method for claim 9, wherein detecting the time zone information change comprises:
    detecting first time zone information of a network in which the portable terminal is located at the time that the rights object for content is provided;
    detecting second time zone information of a network in which the portable terminal is located at the time that the content is used; and computing an absolute time difference between the first time zone information and the second time zone information when the first time zone information is not equal to the second time zone information.

14. A portable terminal for a Digital Rights Management (DRM), the portable terminal comprising:
a time zone detection unit that detects a time zone information change due to a movement of the portable terminal; and
a rights object control unit that controls a use time of a rights object for content in accordance with the time zone information change when the time zone information change is detected,
wherein the time zone information change is detected using MNC (Mobile Network Code)/MCC (Mobile Country Code) information change.

15. The portable terminal for claim 14, further comprising a content use possibility judging unit that determines whether the controlled rights object is completely consumed, and executes the content if the controlled rights object is not completely consumed.

16. The portable terminal for claim 14, wherein the rights object control unit further displays a warning message indicating that the controlled rights object for the content is completely consumed if the controlled rights object is completely consumed.

* * * * *